(12) United States Patent
Adenuga

(10) Patent No.: US 9,246,903 B2
(45) Date of Patent: Jan. 26, 2016

(54) AUTHENTICATION METHOD

(71) Applicant: Money and Data Protection Lizenz GmbH & Co. KG, Bielefeld (DE)

(72) Inventor: Dominic Adenuga, Hamburg (DE)

(73) Assignee: Money and Data Protection Lizenz GmbH & Co. KG, Bielefeld (DE)

( * ) Notice: Subject to any disclaimer, the term of this patent is extended or adjusted under 35 U.S.C. 154(b) by 105 days.

(21) Appl. No.: 14/350,620

(22) PCT Filed: Oct. 30, 2012

(86) PCT No.: PCT/EP2012/071472
§ 371 (c)(1),
(2) Date: Apr. 9, 2014

(87) PCT Pub. No.: WO2013/064493
PCT Pub. Date: May 10, 2013

(65) Prior Publication Data
US 2014/0245391 A1    Aug. 28, 2014

(30) Foreign Application Priority Data

Oct. 31, 2011 (EP) .................................... 11187273

(51) Int. Cl.
*G06F 7/04* (2006.01)
*H04L 29/06* (2006.01)
(Continued)

(52) U.S. Cl.
CPC ............... *H04L 63/08* (2013.01); *G06F 21/34* (2013.01); *G06F 21/42* (2013.01); *G06Q 20/3224* (2013.01); *G06Q 20/385* (2013.01);
(Continued)

(58) Field of Classification Search
CPC ....... G06F 21/42; G06F 21/31; G06Q 20/425; H04L 63/18

USPC ............................................................ 726/3
See application file for complete search history.

(56) References Cited

U.S. PATENT DOCUMENTS 8,444,052 B2 * 5/2013 Ahmed ................ G06Q 20/204
235/380
8,725,652 B2 * 5/2014 Faith ................ G06Q 20/40145
705/64

(Continued)

FOREIGN PATENT DOCUMENTS

EP         1978772 A1   10/2008
EP         2056629 A1    5/2009

(Continued)

*Primary Examiner* — Teshome Hailu
(74) *Attorney, Agent, or Firm* — Richard M. Goldberg

(57) ABSTRACT

A method of authenticating a user to a transaction at a terminal (10), wherein a user identification is transmitted from the terminal (10) to a transaction partner (12) via a first communication channel (14), and an authentication device (18) uses a second communication channel (20) for checking an authentication function that is implemented in a mobile device (16) of the user, and, as a criterion for deciding whether the authentication to the transaction shall be granted or denied, the authentication device (18) checks whether a predetermined time relation exists between the transmission of the user identification and a response from the second communication channel, and the authentication function is normally inactive and is activated by the user only preliminarily for the transaction, the response from the second communication channel (20) includes the information that the authentication function is active, and the authentication function is automatically deactivated.

26 Claims, 4 Drawing Sheets

(51) Int. Cl.

| | | |
|---|---|---|
| *G06F 21/34* | (2013.01) | |
| *G06Q 20/32* | (2012.01) | |
| *G06Q 20/38* | (2012.01) | |
| *G06Q 20/40* | (2012.01) | |
| *G06Q 20/42* | (2012.01) | |
| *G07F 7/10* | (2006.01) | |
| *G06F 21/42* | (2013.01) | |

(52) U.S. Cl.
CPC ......... *G06Q 20/40* (2013.01); *G06Q 20/40145* (2013.01); *G06Q 20/425* (2013.01); *G07F 7/1025* (2013.01); *H04L 63/107* (2013.01); *H04L 63/18* (2013.01)

(56) References Cited

U.S. PATENT DOCUMENTS

| | | |
|---|---|---|
| 2006/0237531 A1 | 10/2006 | Heffez et al. |
| 2008/0035725 A1 | 2/2008 | Jambunathan et al. |
| 2009/0307141 A1 | 12/2009 | Kongalath et al. |
| 2010/0049615 A1* | 2/2010 | Rose ...................... G06Q 20/02 705/17 |
| 2011/0137804 A1* | 6/2011 | Peterson ............... G06Q 20/085 705/77 |
| 2012/0191607 A1* | 7/2012 | Lord ..................... G06Q 20/325 705/44 |
| 2012/0239576 A1* | 9/2012 | Rose ...................... G06Q 20/02 705/44 |

FOREIGN PATENT DOCUMENTS

| | | |
|---|---|---|
| GB | 2398159 A | 8/2004 |
| WO | 98/25371 A1 | 6/1998 |
| WO | 01/26061 A1 | 4/2001 |
| WO | 2005/116907 A1 | 12/2005 |
| WO | 2007/072001 A1 | 6/2007 |
| WO | 2008/052592 A1 | 5/2008 |
| WO | 2010/043722 A1 | 4/2010 |
| WO | 2012/010585 A1 | 1/2012 |
| WO | 2012/025826 A2 | 3/2012 |

* cited by examiner

AUTHENTICATION METHOD

The invention relates to a method of authenticating a user to a transaction at a terminal, wherein a user identification is transmitted from the terminal to a transaction partner via a first communication channel, and an authentication device uses a second communication channel for checking an authentication function that is implemented in a mobile device of the user, and, as a criterion for deciding whether the authentication to the transaction shall be granted or denied, the authentication device checks whether a predetermined time relation exists between the transmission of the user identification and a response from the second communication channel.

In transactions in which a user communicates with a remote transaction partner via a communication channel such as the Internet, it is important to assure that an individual that identifies itself as an authorised user is actually the person it alleges to be. For example, when a user makes an online bank transaction in which he identifies himself as the owner of a certain account and requests that an amount of money is remitted to some other account, an authentication method is needed for verifying the identity of the requestor. Other examples of transactions where an authentication of the user should be required are transactions in which a user asks for online access to a database or other online services that involve sensitive data. Another example would be a transaction for operating a door opener that provides physical access to a secure area or room.

GB 2 398 159 A discloses an authentication method of the type indicated above, wherein the authentication function prompts the user to confirm the transaction, and a corresponding confirmation signal is sent from the mobile device to the authentication device.

WO 2008/052592 A1 discloses a credit card system wherein a mobile device of the user is used for activating and deactivating the credit card.

WO 2007/072001 A1 discloses an authentication method wherein the authentication device responds to the transmission of the user identification with sending an authentication token to the terminal from which the transaction has been requested. This token may for example be encoded in a digital image to be displayed on a display of the terminal. The authentication function in the mobile device is configured to capture this digital image and send it back to the authentication device via the second communication channel.

In this way, it can be confirmed that the person carrying the mobile device, e.g. a mobile telephone, is actually present at the location of the terminal from which the transaction has been requested. Thus, as long as the user is in control of his mobile device, the authentication method assures that no third party can fake the identification data of this user and perform any transactions in his place.

It is an object of the invention to provide an authentication method that is easy to handle and can be carried out with mobile devices of low complexity.

In order to achieve this object, the authentication method according to the invention is characterised in that the authentication function is normally inactive and is activated by the user only preliminarily for the transaction, said response from the second communication channel includes the information that the authentication function is active, and the authentication function is automatically deactivated.

In this method, the complexity of the authentication function can be reduced significantly. In the extreme, all that has to be required from the authentication function is to permit the authentication device to detect whether or not this function is active. Likewise, the only activity that is required from the user for authentication purposes is to activate the authentication function at a suitable timing for the transaction. Once the active state of the authentication function has been detected, this function is returned into the inactive state. The "predetermined time relation" may imply that the authentication function is active at the moment at which the user identification is sent from the terminal. As an alternative, the predetermined time relation may imply that the authentication function is activated within a certain (preferably short) time window after the transmission of the user identification or, conversely, that the user identification is transmitted within a specified time window after the authentication device detected that the authentication function is active.

Since the authentication function is normally inactive, the authentication will almost certainly fail when a third party fraudulently identifies itself as the user in order to initiate a transaction. Then, the authentication would be successful only in the very unlikely event that the true user happens to activate the authentication function of his mobile device just in the right moment. Even in this unlikely case the fraud could be detected because the user will only activate the authentication function when he wants to make a transaction himself. Consequently, the authentication device would detect a coincidence between one activation of the authentication function and two transaction requests (normally launched from different terminals), and this would cause the authentication device (or the transaction partners) to have the transactions denied or reversed. Thus, notwithstanding the low complexity, the method according to the invention offers a high level of security.

More specific optional features of the invention are indicated in the dependent claims.

The terminal from which the user identification is transmitted may be a banking machine or a cashier, for example, but may also be any other device, such as a computer, capable of communicating with a remote transaction partner. The mobile device may for example be a mobile telephone or smartphone, a laptop computer, a tablet computer or the like, but may also be a dedicated device that is designed specifically for the purpose of the authentication method described herein.

It is a particular advantage of the invention that the mobile device does not have to have any specific hardware for capturing or outputting information. All that is required from the mobile device is that it can be activated for a certain (preferably short) period of time and is capable of connecting to a mobile communications network where it has an address that is linked to the identification data of the user, so that the authentication device, when it receives the user identification from the terminal, is capable of checking whether the authentication function of the mobile device with the associated address is active. To that end, it is not even necessary that there is any actual communication between the authentication device and the mobile device. For example, when the mobile device has a mobile telephone (GSM) transceiver, the activation of the authentication function may just consist of activating that transceiver, so that it connects to the nearest Base Station Subsystem (BSS) of the mobile network. As a result, the mobile device will be identified by its device identifier (IMSI), and information on the active state of the mobile device and on the GSM-cell in which it is located will be entered into a Home Location Register (HLR) of the mobile network. Thus, the authentication device may check the active or inactive state of the mobile device just by querying the HLR.

The mobile device may have a plurality of mobile addresses (e.g. mobile telephone numbers) and may even be capable of communicating via a plurality of different mobile networks. In that case, it is preferable that each mobile address is assigned to a different type of transaction (e.g. one telephone number for authenticating bank transactions and another one for authenticating access to a data network), and the authentication function or a plurality of authentication functions are adapted to be activated and deactivated separately for each type of transaction.

In a modified embodiment, for enhanced safety, a plurality of mobile addresses may be assigned to one and the same type of transaction, and the mobile device and the authentication device use identical algorithms for changing from time to time the mobile address that is to be used for authentication purposes.

As an additional security feature, the method according to the invention may comprise a step of locating the mobile device and checking whether, in addition to the predetermined time relation, there is also a predetermined spatial relation between the mobile device and the terminal. In the example that has been described in the previous paragraph, it may for example be checked whether the mobile device is located in the GSM-cell that contains also the location of the terminal.

It may in fact be advantageous when there is no communication whatsoever between the mobile device and the authentication device, nor between the mobile device and the terminal or any other entity, because, when there is no communication, there is no possibility that this communication may be tapped and may be used to outsmart the security system.

In other embodiments of the invention, it is possible that the authentication function in the mobile device receives authentication data from the authentication device via the first or second communication channel, optionally processes these data, and responds to the authentication device in a pre-defined way. For example, certain details of the transaction request, e.g. the account number and the amount to be debited in case of a banking transaction, may be transmitted from the authentication device to the mobile device and may be indicated to the user, e.g. via a display of the device. The user may then either confirm or reject the request. Preferably, the details of the authentication request are sent only after the authentication device has confirmed that the authentication function in the mobile device is active. Thus, if the user has not activated the authentication function, there will be no further communication via the second communication channel, and the user may save communication costs. If the authentication function is active, the communication via the second communication channel may also include a query of certain authentication details, e.g., if the transaction terminal is a computer of the user, the authentication details may include for example the IP address of the computer, the presence of a certain data files or software configurations on the computer, the location of the computer, and the like. By prompting the user to confirm or indicate such information which will only be available to the user, the likelihood of fraud can be reduced significantly. Likewise is it possible that the mobile device sends identification data such as a PIN number, an encoded fingerprint or iris pattern or the like of the user, permitting the authentication device to verify that the registered user is actually in control of the mobile device. These procedures can assure that the mobile device is actually the device that is identified by the IMSI, i.e. that the IMSI has not been imitated.

According an independent aspect of the invention, which may however be incorporated in the method described above, the mobile device includes an interface to some identification token of the user. For example, the interface may be a card reader for reading a smart identity card of the user. Conventionally, a reader for such smart cards or other identification token is connected to the computer or terminal via which the transaction is transaction is requested, so as to certify the identity of the user. This transaction is requested, so as to certify the identity of the user. This procedure, however, does not eliminate the risk that the computer has been infected by some spyware with which the data from the smart card may be intercepted. According to the invention, the sensitive data from the identification token are not transmitted via the computer but via the mobile device which cannot be infected or is at least very unlikely to be infected by spyware. Optionally, the user may be required to activate the identification token, e.g. by entering a password.

When the mobile device is a dedicated device, it is preferable that the electronic components of the device are protected against both electronic and mechanical access.

Embodiments of the invention will now be described in conjunction with the drawings, wherein.

Figure 1:
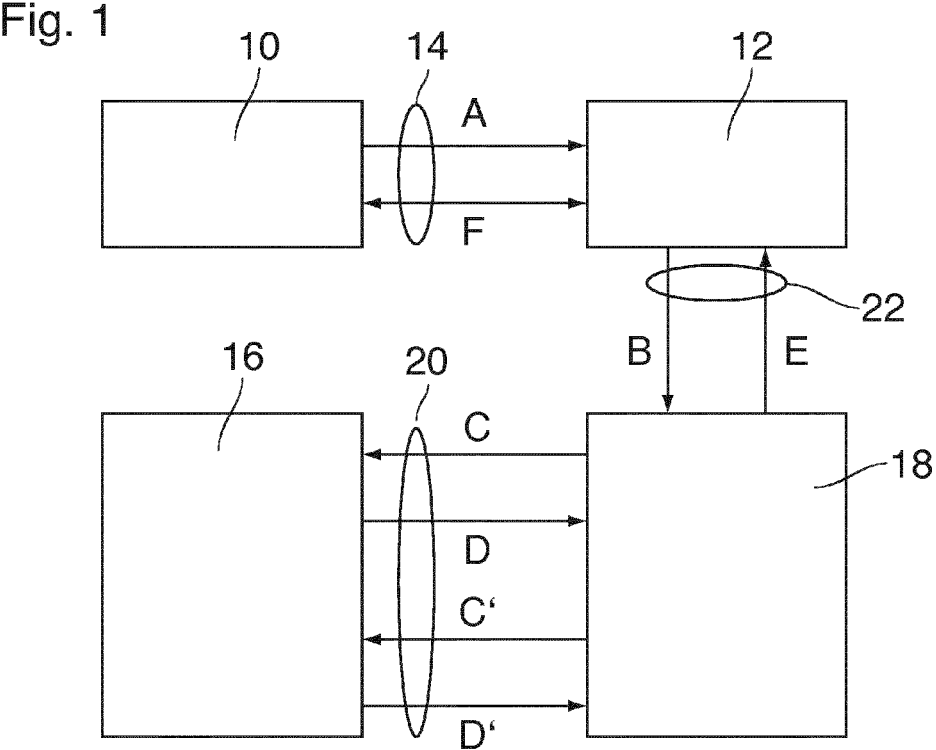
FIG. 1 is a block diagram illustrating an authentication method according to the invention.

As is shown in FIG. 1, a transaction terminal 10, e.g. a banking machine, communicates with a remote transaction partner 12, e.g. a bank, via a first communication channel 14 which may be a wireline or wireless channel. A mobile device 16 communicates with an authentication device 18 via a second communication channel 20 which preferably includes a wireless link, e.g. a mobile telephone network. The authentication device 18 may be installed in the premises of the transaction partner 12 or may be configured as a separate entity communicating with the transaction partner 12 via a third communication channel 22.

The mobile device 16 is carried by a user who is registered as a subscriber to the mobile telephone network forming the communication channel 20. The authentication device 18 is formed by data processing hardware and software and includes a database that stores a user ID of the user and the mobile telephone number (or any another mobile address) of the mobile device 16 of that user.

It shall now be assumed that the user wants to make a bank transaction via the terminal 10. To that end, the user operates the terminal 10 and sends a transaction request to the transaction partner 12. That request includes a step A of transmitting the user-ID to the transaction partner 12. In a step B, the transaction partner 12 forwards the user-ID to the authentication device 18. Thereupon, the authentication device 18 retrieves the mobile telephone number and or the IMSI of the user and contacts the mobile device 16 or at least the mobile telephone network to check whether or not the mobile device 16 or a certain authentication function implemented therein is active (step C). When it is confirmed in step D that the authentication function is active, the authentication device 18 sends an authentication signal to the transaction partner 12 (step E). The authentication signal preferably includes the user-ID that has been sent in step B and informs the transaction partner that this specific user is authenticated to the requested transaction. Thereupon, the transaction between the user and the transaction partner 12 will be performed via the terminal 10 (step F).

Optionally, additional steps C' and D' may intervene between the steps D and E, as has also been illustrated in FIG. 1. The step C' will be performed only when it has successfully been confirmed in step D that the authentication function is active, and the step C' consists in prompting the user to enter certain information into the mobile device. For example, when the transaction terminal 10 is a computer, the user may be asked to enter the version of the virus scanner that has been installed on that computer. This information will then be transmitted to the authentication device 18 in step D' and will be checked against corresponding authentication conditions that have been stored therein. Then, the authentication signal (step E) will be sent only if the information transmitted in the step D' includes the correct authentication condition(s).

Figure 2:
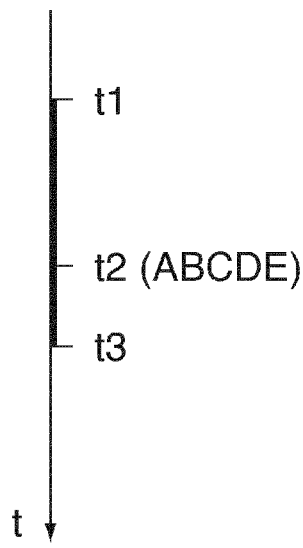
FIGS. 2 to 4 are time diagrams illustrating different embodiments of the invention.

FIG. 2 shows a time diagram illustrating one embodiment of the authentication method that has been outlined above.

At a time t1, the user who wants to request a transaction activates his mobile device 16. At a time t2, the sequence of steps A-B-C-D-E is performed to authenticate the user. Since, at this time, the mobile device 16 is actually active, the authentication is successful. Then, at a time t3, the mobile device 16 is deactivated either manually or automatically by a self-deactivation function implemented in the device 16. As another alternative, a command to deactivate the mobile device 16 may be sent by the authentication device 18 when the user has been authenticated successfully.

Preferably, the time interval from t1 to t3 in which the mobile device 16 is active will be relatively small, e.g. only a few minutes or seconds. When it is found in steps C and D that the mobile device 16 (or at least the authentication function thereof) is not active, it must be assumed that the person who is identified by the user-ID and is in control of the mobile device 16 does not actually want to request a transaction, and it must therefore be concluded that the user-ID sent in step A has been faked by an unauthorised third party. In that case, the authentication is denied in step E.

Figure 3:
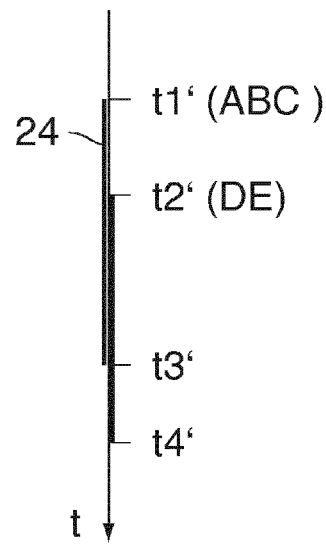

FIG. 3 is a time diagram for a modified authentication process. This embodiment, the steps A, B and C, i.e. the transmission of the user-ID and the query whether the mobile device 16 is active, are performed at a time t1'. Thereupon the authentication device 18 starts a timer that counts a time window 24 within which the mobile device 16 must be activated. In the example shown, the time window 24 begins at the time t1' and ends at a time t'3. In other embodiments, the time window 24 may be opened somewhat later than t1'. At a time t2', the user activates the mobile device 16, and the steps D and E are performed in response thereto. Since t2' lies within the time window 24, the authentication is successful. Would the time t2' not be included in the time window 24, then the authentication would be denied. The mobile device 16 is deactivated again at a time t4'.

Figure 4:
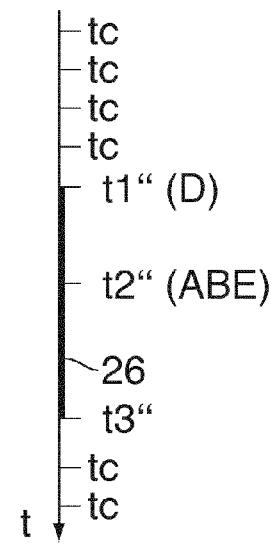

In another embodiment, shown in FIG. 4, the authentication device 18 checks the status of the authentication function in regular time intervals (at times tc). the authentication process begins with the user activating the mobile device 16 at a time t1". More specifically, the user activates an authentication function in the device 16. On the next status check, the authentication device 18 detects that the authentication function is active (step D). The authentication device 18 reacts with starting a counter that counts a time window 26 within which the user-ID must be transmitted for a successful authentication. In the example shown, the user transmits his ID via the terminal 10 at a time t2" which is inside the time window 26. Since the authentication device 18 has already been informed that the authentication function in the device 16 is active, the step B is immediately followed by the step E signalling a successful authentication to the transaction partner 12. The time window 26 is closed at a time t3". Would the step A be performed later than t3", then the authentication would be denied.

In all these embodiments, the authentication process may optionally include additional steps of communication between the terminal 10 and the authentication device 18 and/or between the mobile device 16 and the authentication device 18 or else between the terminal 10 and the mobile device 16 (either directly or via the user). Such communication protocols for authentication purposes are generally known in the art.

For example, the mobile device may use a pre-programmed algorithm to generate an identification code and send it to the authentication device. The pre-programmed algorithm is known to the authentication device and is used there to verify the identity of the mobile device, independently of its IMSI. The identification code may for example be a number from a list of "TAN" numbers that is stored in the mobile device, the algorithm being configured such that each number is used only once. On the other hand, in order to permit an infinite number of transactions, the identification codes may be generated dynamically, possibly with use of data such as the current date or the time of the day. In yet another embodiment, the identification code may be an encrypted password or an encrypted combination of a password with time and date data, the encryption being based on a dynamically varied encryption parameter that is sent from the authentication device.

The authentication will be successful only when the authentication device finds the identification code to be valid. In any case however, according to the invention, the authentication will be denied whenever it is found that the authentication function of the mobile device 16 is not active at the right time.

Figure 5:
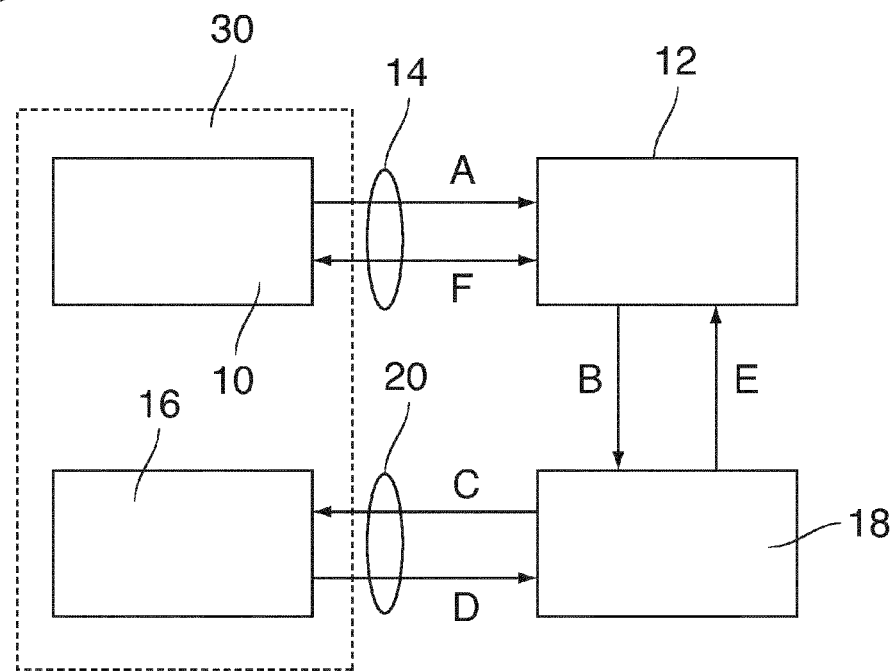
FIG. 5 is a block diagram illustrating another embodiment of the invention.

FIG. 5 shows a block diagram similar to FIG. 1, for an embodiment in which the terminal 10 and the mobile device 16 are physically integrated into one and the same apparatus 30, e.g. a smartphone which has access to the Internet via the mobile telephone network. Thus, the first communication channel 14 is in this case formed to one part by the mobile telephone network and to the other part by the Internet, whereas the second communication channel 20 is formed only by the mobile telephone network.

The authentication procedure is basically the same as in FIGS. 1 to 4. However, since the apparatus 30 is a multi-purpose device, it would not be practical if this device—as a whole—would be normally inactive and would be activated only for short time intervals when an authentication is necessary. However, the authentication function that is implemented in the mobile device 16 may take the form of an applet that can be activated and deactivated independently of the apparatus 30 as a whole. Then of course, in step C in FIG. 5, the active or inactive state of the authentication function cannot be checked just by querying the mobile telephone network whether or not the apparatus 30 is registered as active. Instead, it is necessary that the authentication device 18 actually sends a request to the applet in the mobile device 16 and the applet responds to this request when it is active, or that the applet, when active, sends a request to the authentication device.

Figure 6:
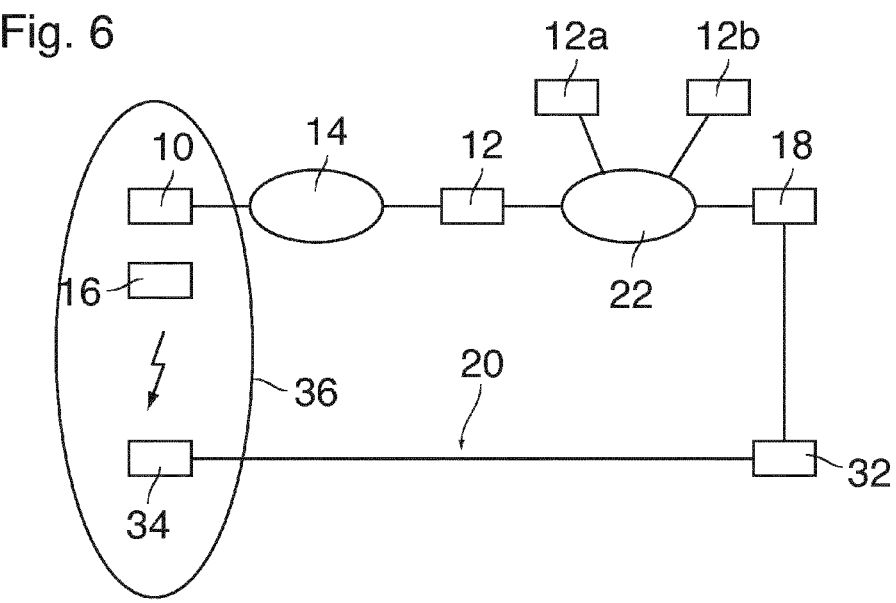
FIG. 6 is a block diagram illustrating an example of a communication scheme for an embodiment of the invention.

FIG. 6 illustrates a communication scheme in which the first communication channel 14 and the third communication channel 22 are formed by the Internet, for example. The authentication device 18 is installed remote from the transaction partner 12 and is run by a Trusted Third Party that is independent from the transaction partner 12. The second communication channel 20 is formed by a mobile telephone network including a Home Location Register (HLR) 32 and a plurality of Base Station Subsystems (BSS) 34 only one of which has been shown in FIG. 6 and each of which serves one or more mobile telephone cells 36.

In this embodiment, the authentication device 18 checks not only whether the mobile device 16 is active or inactive but also identifies the mobile cell 36 in which the device 16 is currently located, and the user is authenticated to the transaction only when the mobile device 16 is found to be active in the prescribed time window and is found to be located in the cell 36 that accommodates also the terminal 10 from which the transaction has been requested. Thus, a false authentication is possible only when the user-ID is sent from a certain terminal 10 at the right moment and, additionally, the mobile device 16 of the true user happens to be located in the vicinity of that terminal 10.

If the mobile network 20 supports Location Based Services (LBS), then the current location of the mobile device 16 may be identified with much higher spatial resolution, and a successful authentication may require that the mobile device 16 is only a few hundreds or a few tens of meters apart from the terminal 10.

In yet another embodiment, the mobile device 16 may include a GPS function, and the authentication function may be configured to send the current GPS coordinates of the mobile device 16 to the authentication device 18.

The invention also includes a variant of the method described above, wherein the spatial relationship between the mobile device and the terminal is checked first and the time relation between the transmission of the user ID and the activation of the mobile device is checked only in case that the spatial relationship is not fulfilled. For example, the mobile device may have a function to automatically connect to the mobile network in certain intervals, e.g. several times per day. Then, when an authentication request is transmitted together with the user ID, the authentication device 18 can locate the mobile device 16 by reference to the HLR of the mobile network, and when the mobile device is found to be close to the terminal or at least is found to be located in a "safe" region, i.e. a region where the likelihood of fraud is small, e.g. when the mobile device is located within a certain country or state, the authentication is granted without checking the active state of the authentication function. Thus, the user does not have to activate the authentication function. On the other hand, when the mobile device is found to be located in a foreign country where the likelihood of fraud is higher, authentication will be denied unless the user activates the authentication function at the correct timing.

This variant of the method provides an improved safety in view of so-called IMSI catchers, i.e. devices that tap the communication of the mobile device in order to gather specific information on the mobile device, e.g. its IMSI. Such IMSI catchers are effective only when a mobile device connects to the mobile network while it is located in close proximity to the IMSI catcher, e.g. at a distance of less than 1 km. Consequently, when an IMSI catcher is installed in the vicinity of a terminal in order to catch IMSIs of users that make transactions at that terminal, and the terminal is located in a "safe" area where the time relation is not checked, the IMSI catcher will fail because the authentication device can locate the mobile device already by reference to the HLR, and there is no need for the mobile device to connect to the mobile network while the user is located close to the terminal and hence within the reach of the IMSI catcher.

The authentication methods using the additional location criterion provide an increased level of security, but have the problem that, technically, the transaction partner 12 would be capable of permanently tracking the mobile device 16, so that privacy requirements or laws might be violated. The privacy of the users may however be preserved by assuring that the mobile addresses, IMSIs, or telephone numbers of the mobile devices 16 are known only to the Trusted Third Party running the authentication device 18, but not to the transaction partner 12. Then, the authentication device 18 will notify to the transaction partner 12 only whether or not the user is authenticated but will not disclose the current location of the user. Since the transaction partner has no access to the IMSI of the mobile device of the user, this procedure also avoids the risk that a dishonest transaction partner imitates the IMSI and/or discloses any other sensitive data of the user.

As is shown in FIG. 6, the authentication device 18 may provide the anonymised authentication services for a plurality of transaction partners 12a, 12b, e.g. a plurality of banks, Internet Service Providers and the like. The authentication methods employed may be different for different transaction partners and may also include methods of the type illustrated in FIGS. 1 to 5 which use only the time criterion.

Figure 7:
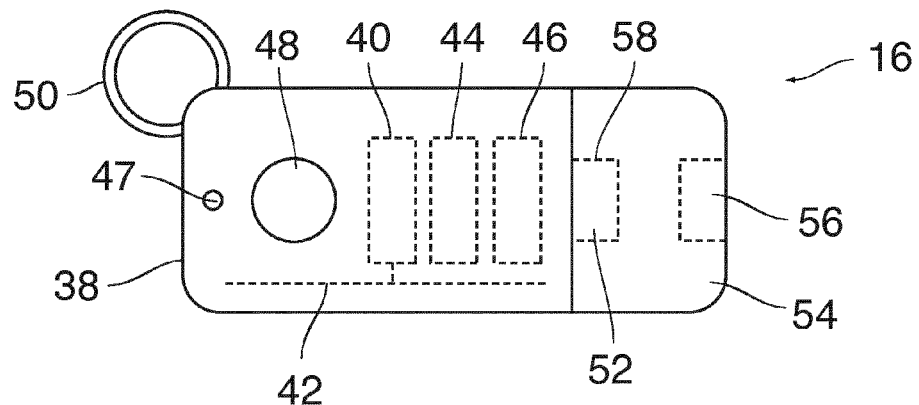
FIG. 7 is a view of a dedicated mobile device for carrying out the method according to the invention.
Figure 8:
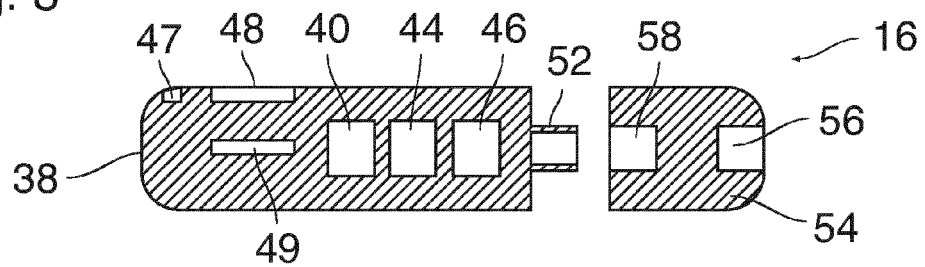
FIG. 8 is a sectional view of the device shown in FIG. 7.

FIGS. 7 and 8 show an example of a mobile device 16 that is dedicated to the specific authentication purpose according to the invention. This device 16 has a body 38 which accommodates a wireless transceiver 40 (e.g. a mobile telephone transceiver) with an antenna 42, an electronic controller 44 a rechargeable battery 46, and a battery charge control lamp 47.

Figure 9:
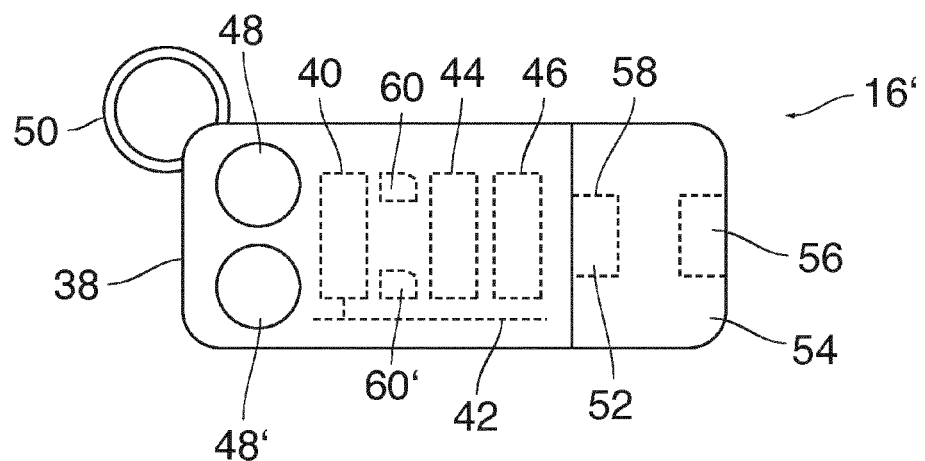
FIG. 9 is a view of a dedicated mobile device according to a modified embodiment

A device identifier (IMSI) is permanently stored in the controller 44 which has the only function to activate and deactivate the transceiver 40 so that the latter may connect and identify itself to the nearest BSS 34. An ON-switch 48 is formed in the surface of the body 38. The ON-switch 48 may simply be formed by a button, so that the user may activate the authentication function (i.e. the transceiver 40) by pressing the button. As an alternative, the ON-switch may be formed by an input device for inputting some secret code (e.g. a PIN) or by a biometric sensor such as a fingerprint sensor or iris recognition sensor, so that the transceiver will be activated only when the identity of the user has been confirmed. As is shown in FIG. 9, a buzzer 49 is provided for giving an acoustic feedback when the authentication function has been activated successfully by pressing the ON-switch 48.

The controller 44 has a self-deactivation function deactivating the transceiver 40 a few seconds after it has been activated.

The body 38 has relatively small dimensions and is attached to a key ring 50 so that it may conveniently be carried along at a bunch of keys of the user.

Projecting from one end of the body 38 is a male socket 52 (e.g. an USB socket or micro-USB socket) which is connected to the battery 46, so that the battery may be recharged by plugging the device 16 into a female USB socket of a computer, a mobile phone or the like. The male socket 52 is covered and protected by a removable cap 54. In the example shown, the cap 54 forms a female socket 56 that is open to the outside and is internally connected to another female socket 58 that accommodates the male socket 52. Thus, the battery 46 may also be recharged by plugging a male USB or micro-USB connector of a power source into the socket 56.

As is shown in FIG. 8, the body 38 is a massive plastic body with the transceiver 40, the controller 44 and the battery 46 cast therein. Thus, physical access to these components, especially the transceiver 40 and the controller 44, is not possible without destroying the body 38.

In a modified embodiment, the controller 44 may include a memory with program code and data for more complex authentication functions, e.g. a function for generating and transmitting a device identification code, as has been described above. However, the controller has no electronic contacts that would provide a possibility to read-out the contents of the memory. Optionally, the controller 44, especially the memory thereof, may be configured such that all stored contents are erased as soon as the body 38 is broken and someone tries to remove the controller therefrom. Thus, the authentication data that may be stored in the memory of the controller 44 are reliably protected against copying.

FIG. 9 shows an example of a mobile device 16' that is dedicated only to authentication purposes but supports two different authentication procedures for two different types of transaction. The device 16' has two SIM cards 60, 60' (or other memory devices) which store different sets of access data. Thus, each of the SIM cards has its own mobile telephone number which may even belong to two different mobile networks. Each mobile telephone number is assigned to a different one of the types of transaction. The two mobile numbers may be registered in two different authentication devices or my be registered in the same authentication device along with information specifying the type of transaction for which they shall be used.

Further, the device 16' has two buttons 48 and 48' for selectively activating one of the two SIM cards 60, 60'. Thus the user may specify the type of transaction he wants to perform by pressing either the button 48 or the button 48' in order to activate the related SIM card and, implicitly, the related authentication function. The controller 44 will then automatically deactivate the authentication function (SIM card) after a certain time interval.

Figure 10:
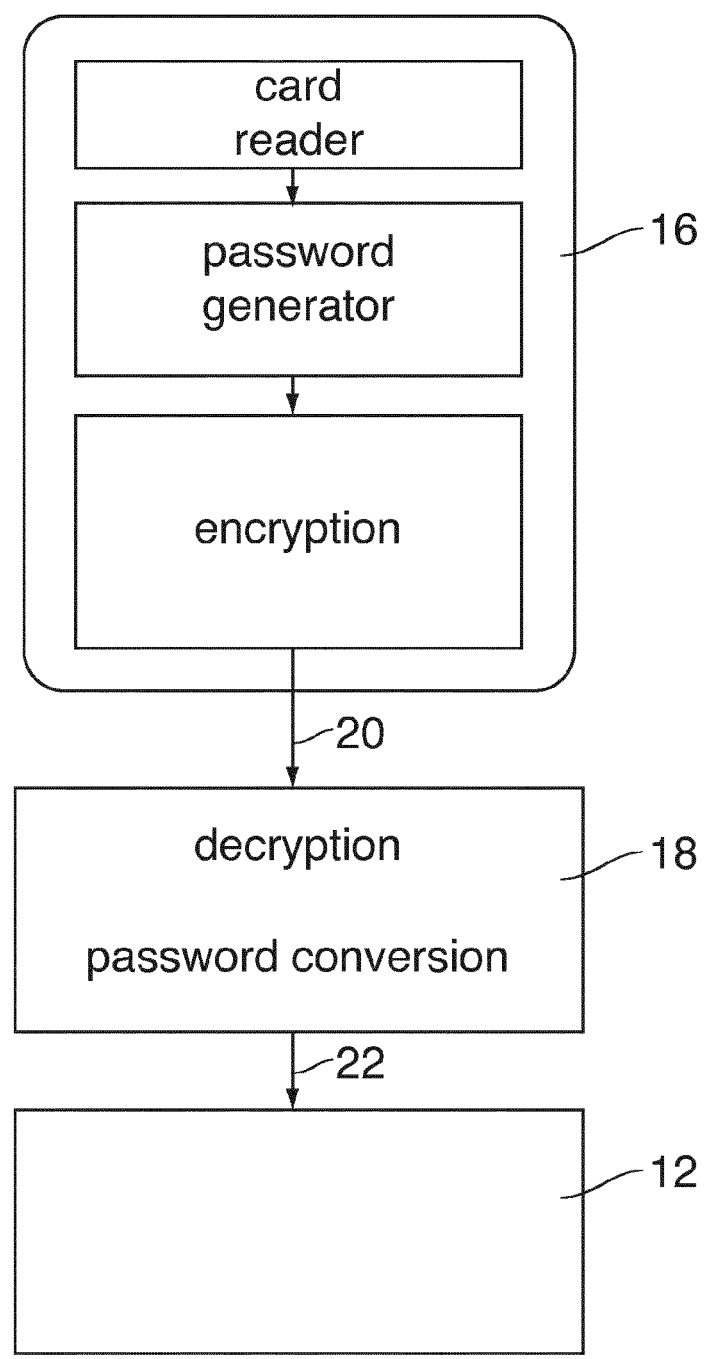
FIG. 10 is a block diagram illustrating a modified communication scheme.

As an alternative, the device 16' may have a plurality of SIM cards (or other Mobile Network Identification Numbers such as IMSI, phone No. and the like) but only a single switch 48 for activating the authentication function. Then, a certain algorithm that is stored in the controller 44 is used for deciding which of the SIM cards is to be used, e.g. depending upon the date, the time of the day or the like. An identical algorithm is used in the authentication device 18, and a successful authentication is possible only when both the mobile device and the authentication device use the same contact data associated with the determined SIM card. FIG. 10 illustrates a useful modification that may be applied to any of the communications schemes discussed above. Normally, the request for authentication sent from the terminal 10 to the transaction partner 12 will include not only the user ID but also a password showing that the user is actually entitled to the service he is requesting. However, in the embodiment shown in FIG. 10, this password is not transmitted via the first communication channel 14 but via the second or third communication channel. This reduces the risk of the combination of password and user ID being captured by tapping one of the communication channels.

The password may for example be configured once in the authentication device 18 (e.g. Trusted Third Party), so that the user does not have to memorize the password nor to input it for each new transaction. When the authentication device 18 grants the authentication, it will automatically add the password that is pertinent for the specific transaction partner 12 and the requested service, respectively, and the password will be transmitted to the transaction partner 12 together with the authentication.

In another embodiment, the password may be stored permanently in the mobile device 16 and sent to the authentication device 18 via the wireless communication channel 20 in the step D described above. In the embodiment shown in FIG. 10, the mobile device includes instead a password generator 62 that generates a dynamically changing password according to a certain algorithm that is mirrored by the authentication device 18. Thus even if the IMSI has been captured by a IMSI catcher, the fraud can still be detected because of a mismatch of the passwords generated in the mobile device 16 and the authentication device 18, respectively. Preferably, the password sent via the communication channel 20 is encrypted.

Further, in the example shown, the password generated in the mobile device is a universal password that is used for each authentication process regardless of the transaction partner and the type of service involved. Then, based on information on the specific type of service, as transmitted from the transaction partner 12 in step B, if the authentication is successful, the authentication device 18 automatically converts the universal password into a specific password that is pertinent for the type of service.

In yet another embodiment, as is also shown in FIG. 10, the mobile device 16 includes also an interface to some identification token of the user. In the example shown, the interface is a card reader for reading a smart card, e.g. a smart identity card or smart passport card of the user. The user will insert his smart card into the card reader (or the smart card is permanently accommodated in the card reader), so that the identification data from the smart card may be read and may be transmitted via the communication channel 20 together with the password or in place of the password.

What is claimed is:

1. A method of authenticating a user to a transaction at a terminal, comprising the steps of:
    transmitting a user identification from the terminal to a transaction partner via a first communication channel,
    providing an authentication step in which an authentication device uses a second communication channel for checking an authentication function that is implemented in a mobile device of the user,
    as a criterion for deciding whether the authentication to the transaction shall be granted or denied, having the authentication device check whether a predetermined time relation exists between the transmission of the user identification and a response from the second communication channel,
    ensuring that the authentication function is normally inactive and is activated by the user only preliminarily for the transaction,
    ensuring that said response from the second communication channel includes information that the authentication function is active, and
    thereafter ensuring that the authentication function is automatically deactivated.

2. The method according to claim 1, wherein the step of thereafter ensuring that the authentication function is automatically deactivated includes the step of deactivating the authentication function after a predetermined time interval after at least one of:
    activation thereof and
    when an active state thereof has been checked.

3. The method according to claim 1, wherein said authentication step includes the step of logging-on the mobile device to a mobile communications network that provides the second communication channel.

4. The method according to claim 3, further including the step of having the mobile communications network permit the authentication device to detect the logged-on state of the mobile device and hence an active state of the authentication function by checking only a communication register of the network, without having to communicate with the mobile device.

5. The method according to claim 1, further comprising the step of having the authentication device determine a current location of the mobile device and denying the authentication of the user when the locations of the terminal and of the mobile device do not fulfil a predetermined spatial relationship.

6. The method according to claim 5, wherein the second communication channel involves a mobile communications network supporting Location Based Services, and further comprising the step of having the authentication device use these Location Based Services for locating the mobile device.

7. The method according to claim 5, further comprising the step of having the mobile device detect its own location and send location information to the authentication device.

8. The method according to claim 1, further comprising the steps of:
having the authentication device determine a current location of the mobile device and authenticate the user when the locations of the terminal and of the mobile device fulfil a predetermined spatial relationship, and
checking the active state of the authentication function in the mobile device only when said spatial relationship is not fulfilled.

9. The method according to claim 1, wherein the authentication device is remote from the transaction partner and further comprising the steps of:
having the authentication device communicate with the transaction partner via a third communication channel,
storing information linking the user identification to an address of the mobile device in the mobile communications network only in the authentication device, and
having the authentication device notify to the transaction partner only whether or not the user is authenticated, without disclosing any further data pertaining the user and the mobile device.

10. The method according to claim 1, further comprising the step of transmitting a password to the transaction partner via the authentication device.

11. The method according to claim 10, further comprising the steps of one of storing and generating the password in the mobile device and transmitting the password to the authentication device.

12. The method according to claim 10, further comprising the step of one of storing and converting the password in the authentication device.

13. The method according to claim 1, further comprising the steps of:
interfacing the mobile device to an identity token of the user to read identity data therefrom, and
transmitting these identity data to the authentication device via the second communication channel.

14. A mobile device for use with the authentication method according to claim 1, comprising:
a wireless transceiver,
an ON-switch and
an electronic controller that implements said authentication function and is configured to activate the authentication function in response to the ON-switch being operated and to deactivate the authentication function one of:
after it has been active for a predetermined time interval
after its state has been checked.

15. The device according to claim 14, further comprising:
a rechargeable battery and
a connector for connecting the battery to a voltage source.

16. The device according to claim 15, comprising a display for indicating the charge state of the battery.

17. The device according to claim 15, wherein the connector is one of
a USB connector and
a micro-USB connector.

18. The device according to claim 15, wherein the connector is a male connector covered by a removable cap that includes two female connectors permitting to connect the male connector to a voltage source via one of the female connectors while the other of the female connectors is coupled to the male connector.

19. The device according to claim 14, comprising a positioning function for wireless detection of its own position, wherein the authentication function includes a function of sending a detected location via the transceiver.

20. The device according to claim 14, wherein the authentication function consists only of activating and deactivating the transceiver.

21. The device according to claim 14, comprising a body that encapsulates at least the controller and prevents access thereto.

22. The device according to claim 14, comprising a self-destruction function configured to be activated by an attempt of enforced access.

23. The device according to claim 14, wherein the transceiver constitutes an only data input and output port of the controller.

24. The device according to claim 14, comprising a storage for a plurality of mobile addresses, and an input including the ON-switch and adapted to selectively activate one of a plurality of authentication functions each of which is assigned to a different one of said mobile addresses.

25. The device according to claim 14, comprising a storage for a plurality of mobile addresses, wherein the controller is configured to select one out of the plurality of mobile addresses according to a predetermined algorithm.

26. The device according to claim 14, comprising an acoustic transducer for providing an acoustic feedback signal upon at least one of activation and deactivation of the authentication function.

* * * * *